United States Patent
Alsadah (10) Patent No.: US 9,079,119 B2
(45) Date of Patent: Jul. 14, 2015

(54) FLEXIBLE BELT EVAPORATOR

(71) Applicants: KING FAHD UNIVERSITY OF PETROLEUM AND MINERALS, Dhahran (SA); KING ABDULAZIZ CITY FOR SCIENCE AND TECHNOLOGY, Riyadh (SA)

(72) Inventor: Jihad Hassan Alsadah, Dhahran (SA)

(73) Assignees: KING FAHD UNIVERSITY OF PETROLEUM AND MINERALS, Dhahran (SA); KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 173 days.

(21) Appl. No.: 13/752,327

(22) Filed: Jan. 28, 2013

(65) Prior Publication Data

US 2014/0209253 A1  Jul. 31, 2014

(51) Int. Cl.
- B01D 1/18 (2006.01)
- B01D 1/24 (2006.01)
- C02F 1/12 (2006.01)
- B01D 1/22 (2006.01)

(52) U.S. Cl.
CPC .. B01D 1/24 (2013.01); B01D 1/18 (2013.01); B01D 1/222 (2013.01); C02F 1/12 (2013.01)

(58) Field of Classification Search
CPC .............. C02F 1/006; C02F 1/12; C02F 1/14; C02F 1/042; C02F 1/043; C02F 2301/026; C02F 2301/046; B01D 1/0035; B01D 1/0064; B01D 1/18; B01D 1/20; B01D 1/24; B01D 1/222; Y10S 159/901; Y10S 159/903; Y10S 210/03; Y10S 165/227

See application file for complete search history.

(56) References Cited

U.S. PATENT DOCUMENTS

| | | | | |
|---|---|---|---|---|
| 1,981,691 A * | 11/1934 | Schepper | ......................... | 159/49 |
| 3,210,260 A * | 10/1965 | Denker et al. | ................... | 203/11 |
| 3,573,158 A * | 3/1971 | Pall et al. | ....................... | 162/131 |
| 3,589,263 A * | 6/1971 | Casey | ............................ | 396/577 |
| 3,964,960 A * | 6/1976 | Marans | ........................... | 159/49 |
| 3,995,298 A * | 11/1976 | Vandeputte et al. | ........... | 396/626 |
| 4,116,756 A * | 9/1978 | Quee | ............................... | 159/45 |
| 4,424,098 A | 1/1984 | Hartig | | |
| 4,728,394 A | 3/1988 | Shinjou et al. | | |
| 4,940,134 A * | 7/1990 | Aoki et al. | ..................... | 202/202 |
| 4,949,555 A * | 8/1990 | Chao | ............................... | 62/374 |

(Continued)

FOREIGN PATENT DOCUMENTS

GB  2330779  5/1999
WO  WO 2004/067451  8/2004

*Primary Examiner* — Virginia Manoharan
(74) *Attorney, Agent, or Firm* — Richard C Litman (57) ABSTRACT

The flexible belt evaporator employs an endless woven textile belt serving as a carrier for saline or otherwise contaminated water for evaporation of the water therefrom, and also serves as the evaporator surface. Mechanical equipment immersed in the saltwater and corresponding maintenance difficulties are largely avoided by placing most or all belt rollers clear of the liquid water tank of the system. Saltwater or contaminated water is sprayed onto the belt from above. The continuing passage of the belt about the exposed rollers results in water evaporation from the belt. Scale and residue buildup on the belt is removed by passing the belt through a wash tank. The wash tank preferably contains an ultrasonic generator to produce ultrasonic energy for removal of residue from the textile belt. The flexible belt evaporator system may be applied to evaporative cooling systems, humidifying systems, and salt or residue recovery systems.

14 Claims, 6 Drawing Sheets

(56) References Cited

U.S. PATENT DOCUMENTS

| | | | | |
|---|---|---|---|---|
| 5,340,436 A | * | 8/1994 | Beckett | 216/91 |
| 6,092,298 A | * | 7/2000 | Salminen et al. | 34/71 |
| 6,652,602 B2 | * | 11/2003 | Yang et al. | 8/512 |
| 2009/0318044 A1 | * | 12/2009 | Butz et al. | 442/64 |
| 2011/0226698 A1 | | 9/2011 | Al-Mayahi et al. | |

* cited by examiner

FLEXIBLE BELT EVAPORATOR

BACKGROUND OF THE INVENTION

1. Field of the Invention

The present invention relates generally to water evaporation systems, and particularly to a flexible belt evaporator for cooling and humidifying closed areas and for the desalination of water.

2. Description of the Related Art

Water evaporation systems are well known for various purposes, e.g., removing seawater to recover salt and/or other minerals, cooling due to the heat absorption of evaporating water, and humidifying air. Accordingly, a number of different water evaporation devices, systems, and methods of operation have been developed in the past.

A general class of such systems comprises the spreading of a relatively thin film or layer of water on a sheet of material so that the relatively large surface area per volume of water provides reasonably efficient evaporation. The problem with this principle of operation is that salt or other contaminants or impurities in the water will rapidly coat the sheet of material once the water evaporates. Some means must be provided for removal of the salt and/or other residue from the evaporation sheet or substrate material, at least from time to time. The more efficient the evaporative process, the more rapidly the salt and/or other residue builds upon the evaporative base material. Some method for preventing salt from accumulating on the evaporator would increase the efficiency and extend the life of the device.

Thus, a flexible belt evaporator solving the aforementioned problems is desired.

SUMMARY OF THE INVENTION

The flexible belt evaporator has an endless water absorbent textile belt or web that is continually advanced over and around a plurality of rollers. The textile material is preferably formed with hydrophilic weft or woof strands or threads disposed generally horizontally, i.e., across the width of the web, and hydrophobic warp strands or threads disposed vertically, i.e., in the direction of travel of the web. This limits or obviates water absorption along the vertical strands, thus slowing any dripping that might otherwise occur from an overly saturated belt or web.

Most, or all, of the rollers are located clear of any liquid water. The water that is contaminated with salt and/or other materials is sprayed onto the textile belt from above as the belt passes over a series of upper rollers. Evaporation takes place as the textile belt or web is advanced over and about the rollers. The salt and/or other residue remains on the belt. The belt is then passed through a wash tank, where the salt and/or other residue is washed or otherwise cleaned from the belt. The wash tank preferably includes an ultrasonic generator using ultrasonic energy to better remove the salt and/or other residue from the textile belt or web. The belt then passes from the wash tank to continue its endless path about the rollers, where it is again wetted by the overhead spray nozzles.

In one embodiment, belt tension is maintained by one or more rollers immersed in the lower portion of the wash tank. In another embodiment, the belt passes loosely through the wash tank, and no rollers are installed in the tank. Belt tension exterior to the wash tank is maintained by pinch rollers adjacent to the wash tank. This embodiment avoids the need for installation of rollers in the salt contaminated wash tank, and the corresponding difficulties in maintenance of the rollers in such an environment. The evaporative system may be applied to cooling systems, humidifying systems, and salt and/or contaminant recovery systems for water.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The flexible belt evaporator has an endless flexible woven textile belt or web that passes about a series of rollers. A spray system is provided above the rollers to wet the belt with salt water or water containing other impurities. The belt is exposed to the air between the rollers to evaporate water from the belt. A wash bath is provided to rinse the salt and/or other impurities from the belt. The apparatus may be used to cool the surrounding air by means of the heat absorbed by the evaporating water, to humidify air as the water evaporates from the belt, and/or to collect salt and/or other residue from the belt after the water evaporates therefrom.

Figure 1:
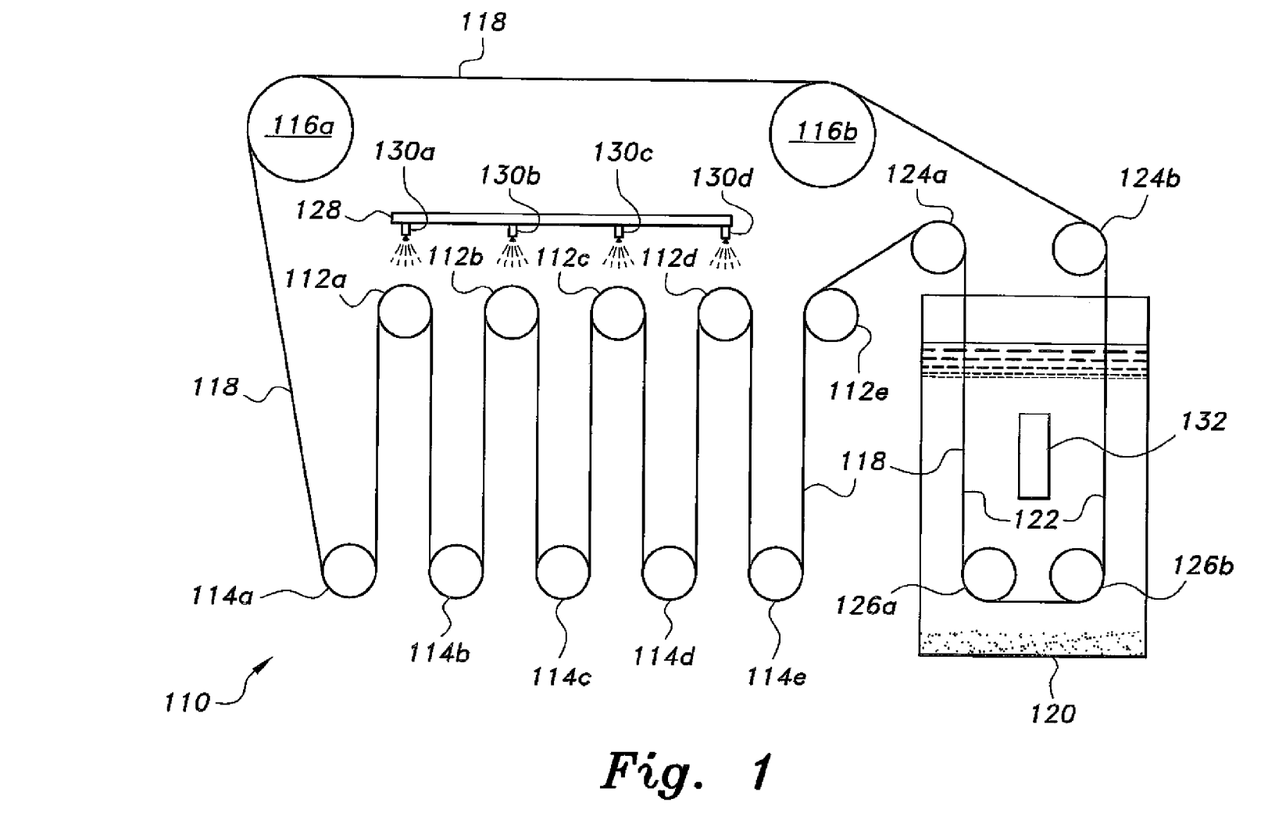
FIG. 1 is a diagrammatic elevation view of a first embodiment of a flexible belt evaporator according to the present invention, having rollers disposed within the wash tank.

FIG. 1 of the drawings is a diagrammatic drawing of a first embodiment 110 of the flexible belt evaporator. The evaporator 110 includes a plurality of closely spaced upper guide rollers 112a, 112b, 112c, 112d, and 112e, and a plurality of closely spaced lower guide rollers 114a, 114b, 114c, 114d, and 114e. It will be seen that more or fewer upper and lower guide rollers may be provided. The guide rollers 112a through 114e, and other rollers employed with the evaporator 110, may have their rotational axes sloped slightly from the horizontal to encourage water runoff toward one end thereof, if desired. The upper guide rollers 112a through 112e are separated vertically from the lower rollers 114a through 114e by a clear span that is greater than the span between adjacent rollers, through which air may be circulated for evaporation. This configuration provides a very compact horizontal area for the flexible belt evaporator 110 in comparison to the overall evaporative area of the belt 118, as most of the area of the belt 118 is oriented generally vertically between the alternating upper and lower rollers. First and second master rollers 116a and 116b are disposed above the upper guide rollers 112a through 112e. One of the rollers, e.g., the first master roller 116a, may be motorized, as is conventional in the art of conveyor belts and the like.

An endless, water-absorbent, flexible woven fabric belt 118 travels a sinusoidal path about the guide rollers 112a through 114e. The belt 118 passes about the first lower guide roller 114a, then up and over the first upper guide roller 112a, back down to the second lower guide roller 114b, and continues in sequence about guide rollers 112b, 114c, 112c, 114d, 112d, 114e, and 112e. A wash bath or tank 120 is provided adjacent to the last guide rollers 112e and 114e, to wash salt and/or other residue from the belt 118 after saltwater or other contaminated water evaporates from the belt. The belt 118 forms a loop portion 122 that passes through the wash bath or tank 120. The belt 118 is guided into the wash bath 120 by an entrance roller 124a, and is guided from the wash bath 120 and back to the second master roller 116b by a wash bath exit roller 124b. While the return path for the belt 118 is shown extending over the two master rollers 116a and 116b and above the upper rollers 112a through 112e, it will be seen that the belt return path may extend beneath the lower rollers 114a through 114e and beneath the wash bath 120 by providing rollers in appropriate locations. One or more wash bath rollers, e.g., first and second wash bath rollers 126a and 126b, are installed within the wash tank 120 to maintain tension on the endless belt 118 as it travels about the rollers 112a through 116b and the wash bath entrance and exit rollers 124a and 124b.

A water dispenser 128 is disposed above the upper rollers 112a through 112d or 112e, generally between the two master rollers 116a and 116b. The water dispenser 128 preferably comprises a plurality of spray nozzles 130a through 130d, oriented to spray saltwater or water containing other contaminants onto the belt 118 as it passes over and around the upper guide rollers 112a through 112e. More or fewer spray nozzles may be provided, the drawing being exemplary. The woven fabric of the belt 118 absorbs the saltwater (saline) or otherwise contaminated water from the spray nozzles 130a through 130d and travels around the various upper and lower rollers to expose the wet belt surface to the air for evaporation. Individual drip catch trays or a single large drip catch pan may be placed beneath the lower rollers 114a through 114e. Any collected salt and/or other residue remains on the belt. The belt 118 continues its travel around the rollers 112a through 114e, eventually reaching the wash bath 120 via the entrance roller 124a. The loop portion 122 of the belt 118 is immersed in the wash bath 120 so that the salt and/or other residue is washed from the belt 118. An ultrasonic device 132 may be installed within the wash bath 120 to remove fine particulates from the belt 118 ultrasonically. Also, chemicals may be provided in the wash bath 120 for further cleaning of the belt 118. After passing through the wash bath 120, that portion of the endless belt 118 continues its travel back across the master rollers 116a, 116b to travel through the upper and lower rollers 112a through 114e in order to be wetted once again for further evaporation.

Figure 2:
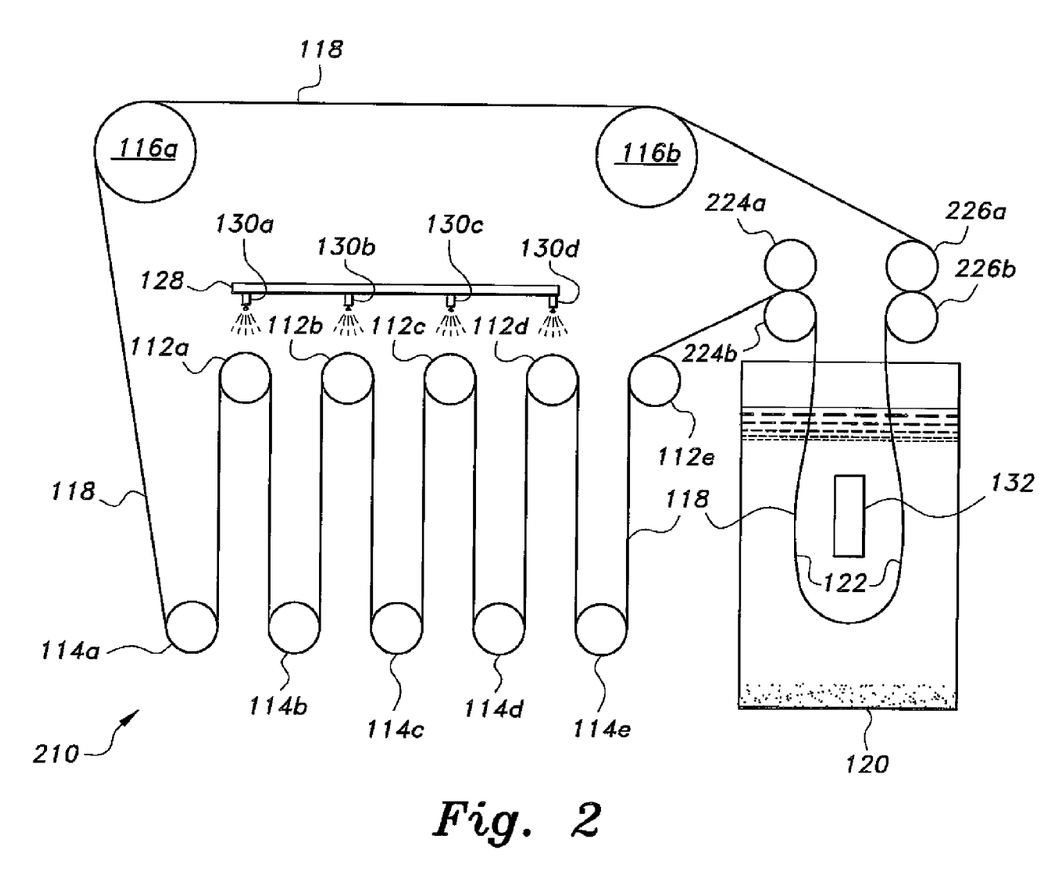
FIG. 2 is a diagrammatic elevation view of a second embodiment of a flexible belt evaporator according to the present invention, having no rollers installed within the wash tank.

FIG. 2 of the drawings is a diagrammatic illustration of an alternative embodiment of the flexible belt evaporator, designated as flexible belt evaporator 210. The flexible belt evaporator 210 of FIG. 2 includes most of the components of the flexible belt evaporator 110 of FIG. 1, i.e., upper and lower guide rollers 112a through 114e, master rollers 116a and 116b, belt 118, wash bath 120, the belt loop 122 immersed in the wash bath 120 (the loop is flaccid, in the embodiment of FIG. 2), the water dispenser 128 and spray nozzles 130a through 130d, and the ultrasonic device 132. These like numbered components are essentially identical in the two embodiments 110 of FIGS. 1 and 210 of FIG. 2. However, it will be noted that there are no rollers immersed within the wash bath 120 in the flexible belt evaporator 210 of FIG. 2. This results in the belt loop 122 being loosely suspended within the wash bath tank 120 in the embodiment of FIG. 2. The remainder of the belt 118 is kept taut by a first or entrance pair of pinch rollers 224a and 224b, and a second or exit pair of pinch rollers 226a and 226b. These pinch rollers 224a through 226b are roughly analogous to the entrance and exit rollers 124a and 124b of the embodiment 110 of FIG. 1, but two rollers at each location are required to grip or pinch the belt 118 therebetween in order to prevent the slack in the loop 122 from spreading about the remainder of the endless belt as it passes over and around the rest of the roller system. The flexible belt evaporator 210 of FIG. 2 avoids the need for any rollers within the water of the wash bath 120, thus avoiding the problems of operation and maintenance of a moving mechanical device within a corrosive liquid, i.e., the salty or otherwise contaminated water that collects in the wash bath 120.

Figure 3:
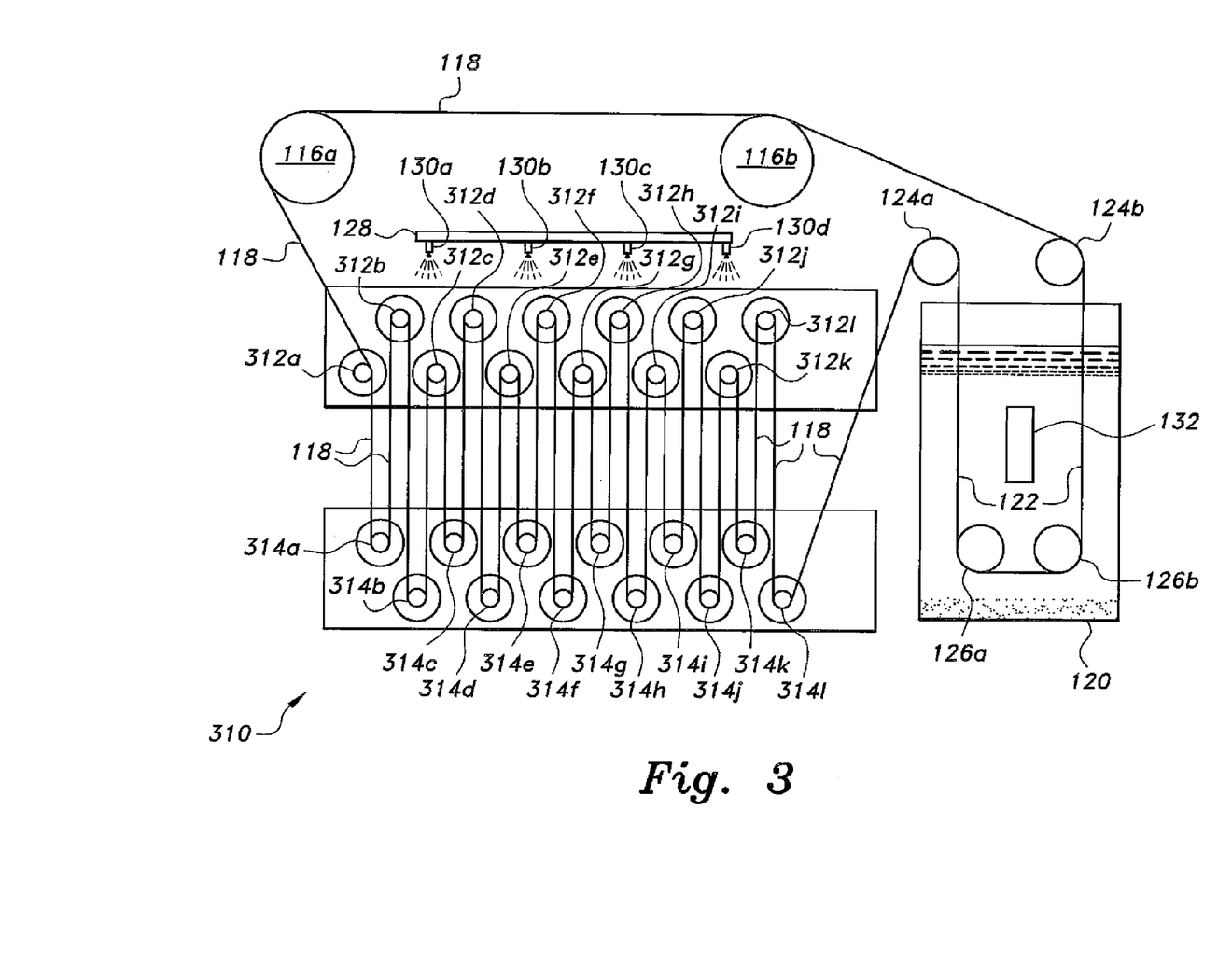
FIG. 3 is a diagrammatic elevation view of a third embodiment of a flexible belt evaporator according to the present invention, having a large number of closely spaced rollers.

FIG. 3 provides a diagrammatic illustration of another embodiment of the evaporator, designated as flexible belt evaporator 310. The configuration of the flexible belt evaporator 310 is similar to that of the evaporator 110 of FIG. 1, but includes a much greater number of upper and lower guide rollers. These guide rollers are designated as upper guide rollers 312a through 312l and lower guide rollers 314a through 314l. They differ from their corresponding rollers 112a through 112e and 114a through 114e of the embodiments 110 of FIGS. 1 and 210 of FIG. 2 in that the diameters of the rollers 312a through 314l are considerably smaller than the diameters of the rollers 112a through 114e. Advantageous placement of the smaller diameter rollers 312a through 314l to one another may be made, even though their bases and bearings may be essentially the same diameter as the diameters of the rollers 112a through 114e, by staggering the alternating rollers of each set relative to one another. Thus, the first upper roller 312a is offset vertically slightly below the second upper roller 312b, the second upper roller 312b is slightly higher than the third upper roller 312c, etc. This places every other upper roller 312a, 312c, 312e, 312g, 312i, and 312k in a horizontal row below a horizontal row containing the other upper rollers 312b, 312d, 312f, 312h, 312j, and 312l. The lower rollers are arranged similarly, so that the lower rollers 314a, 314c, 314e, 314g, 314i, and 314k are aligned in a horizontal row slightly above another horizontal row containing lower rollers 314b, 314d, 314f, 314h, 314j, and 314l. This configuration allows a much larger vertical evaporative surface area for the belt 118 as it passes back and forth between the much greater number of rollers. The remaining components 116 through 132 of the embodiment 310 of FIG. 3 are substantially identical to those like designated components in the embodiment 110 of FIG. 1 and operate in the same manner.

The provision of relatively large diameter bearings is desirable in order to reduce the rolling friction of the various rollers. This friction can be substantial when a large number of rollers is considered. It will be seen that by staggering the adjacent rollers in each of the upper and lower sets or rows, the bases and/or bearings of each roller may be larger than would otherwise be the case, and/or the rollers may be placed closer to one another than in a linear array of rollers in order to increase the density of the flexible belt and the evaporative surface area as the belt runs among the closely spaced rollers. In fact, the diameters of the bearings and their bases in the configuration of FIG. 3 may be a few times larger (e.g., 2-4 times larger) than the diameters of the rollers because the rollers and their bearings are staggered in the manner illustrated in FIG. 3. The two upper and lower rows of rollers illustrated in FIG. 3 are exemplary, and are not intended to be limiting. Even larger bearings may be used by configuring the system to have three or more upper and lower rows of rollers, as desired.

Figure 4:
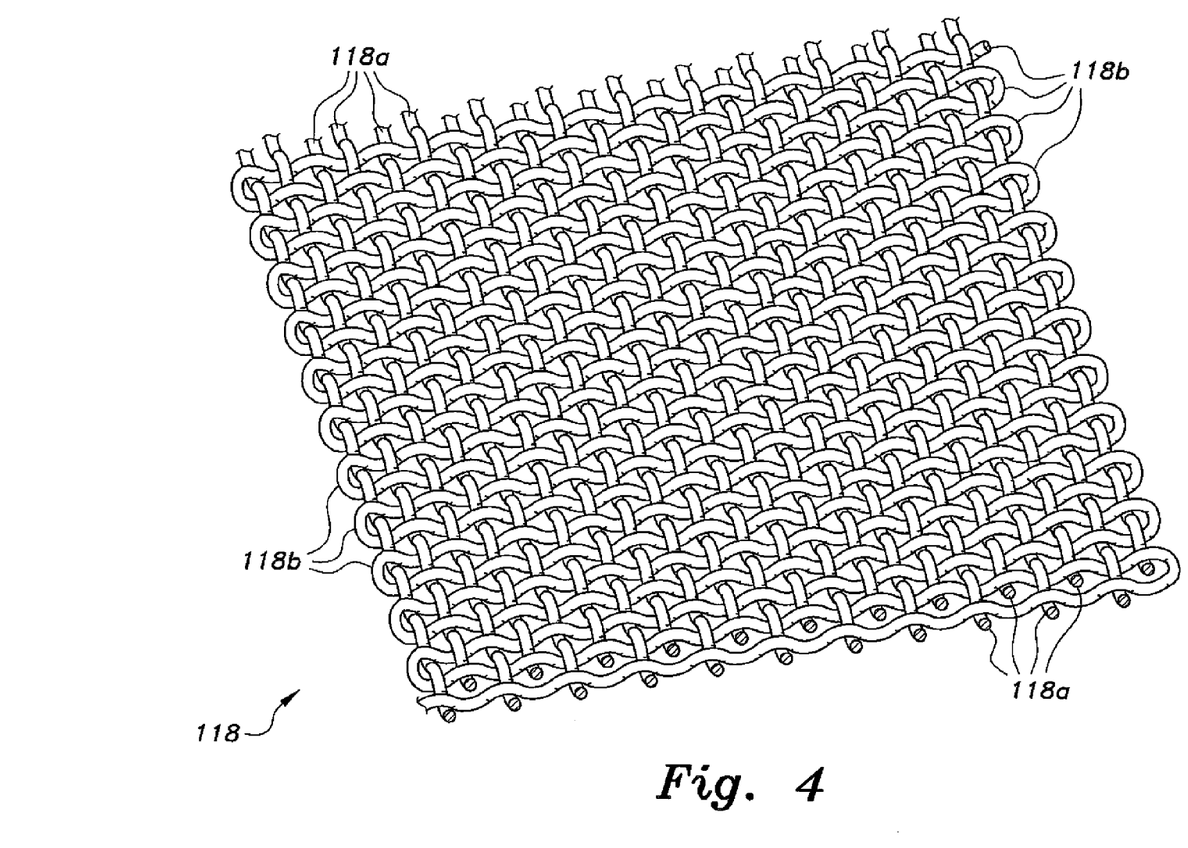
FIG. 4 is a partial perspective view of a woven textile incorporating mutually orthogonal hydrophilic and hydrophobic strands in its weave for use as the belt in a flexible belt evaporator according to the present invention.

FIG. 4 is a perspective view of a portion of the absorbent, flexible woven fabric belt 118 used in the various embodiments of the flexible belt evaporator. The belt or web 118 is preferably formed with the warp strands or threads 118a, i.e., those strands extending vertically between the upper guide rollers and the lower guide rollers, being hydrophobic or water-repellent. The weft or woof strands or threads 118b, i.e., those strands extending parallel to the rotary axes of the rollers, are hydrophilic or water-absorbent. A belt or web 118 manufactured in this manner will have the horizontal or weft strands 118b absorbing water as the water is repelled from the vertical or warp strands 118a, thus greatly reducing vertical runoff along the belt or web 118 as it extends vertically between upper and lower rollers.

Figure 5:
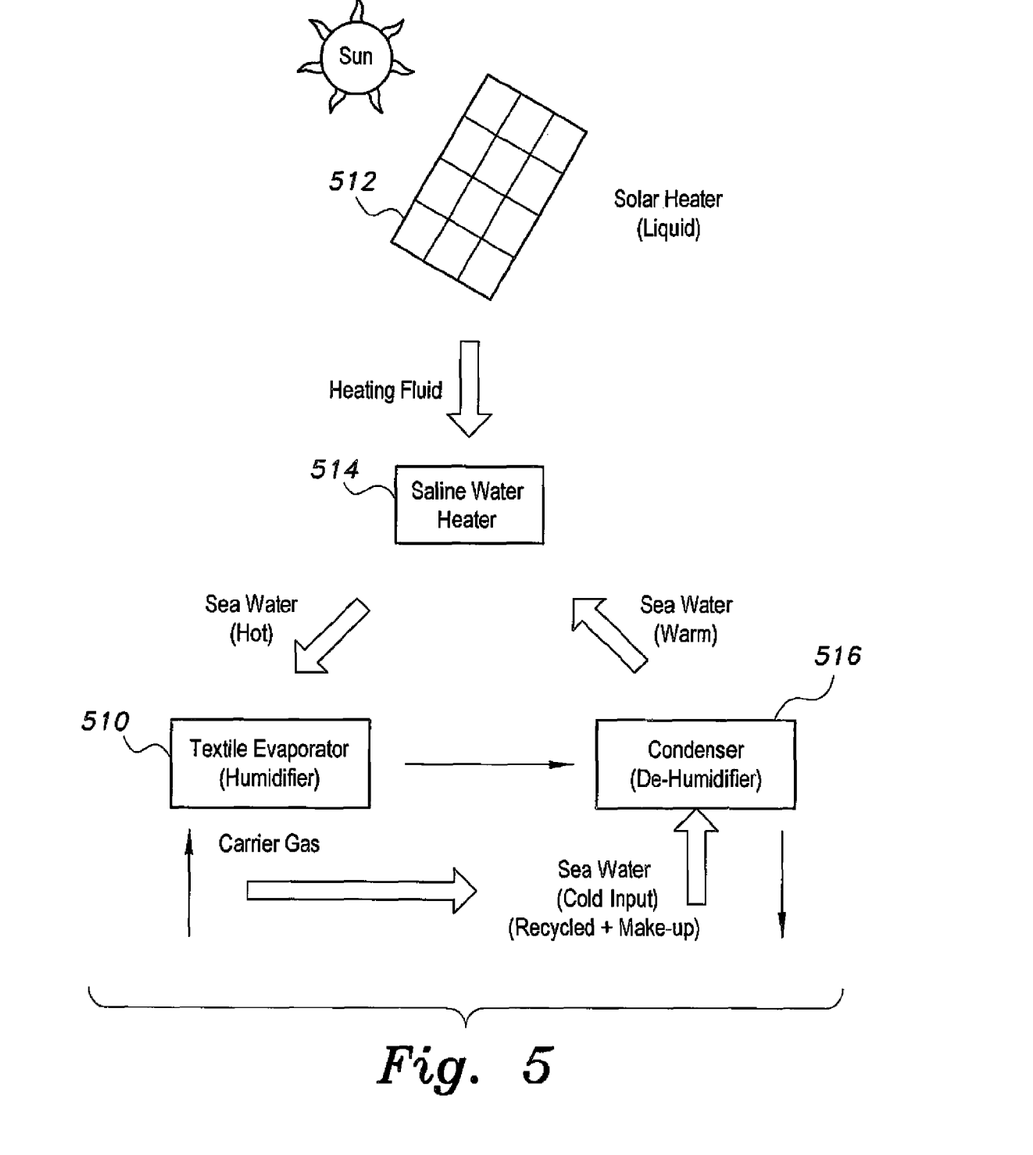
FIG. 5 is a flowchart illustrating the flow paths of water and air in a solar-heated heat exchanger and desalination system.

FIG. 5 is a schematic diagram or flowchart illustrating the components of an evaporative cooling and desalination system incorporating the flexible belt evaporator of the present invention. The evaporator of FIG. 5 is designated as 510, but it will be understood that it may comprise any of the flexible belt evaporators 110, 210, or 310 respectively of FIG. 1, 2, or 3, and/or any of the variations thereof described further above. In FIG. 5, solar energy is applied to a solar-powered liquid heater 512. The heated fluid is used to heat seawater or other contaminated water in a water heater 514. The heated seawater (or other water) then passes to the flexible belt evaporator 510, where the heat assists in the evaporative process. The heat absorption accomplished by the water as it evaporates in the flexible belt evaporator 510 results in a cooling of the air (or other gas) in which the water vapor is suspended. The high humidity air or gas is then passed to a condenser 516, and the condensed water is returned to the water heater 514 to repeat the cycle. Additional water may be added as necessary, but the water cycling is essentially a closed system. The evaporative cooling and desalination system of FIG. 5 requires no net energy input, other than the solar energy used to heat a fluid that is, in turn, used to heat the saline water circulating in the system.

Figure 6:
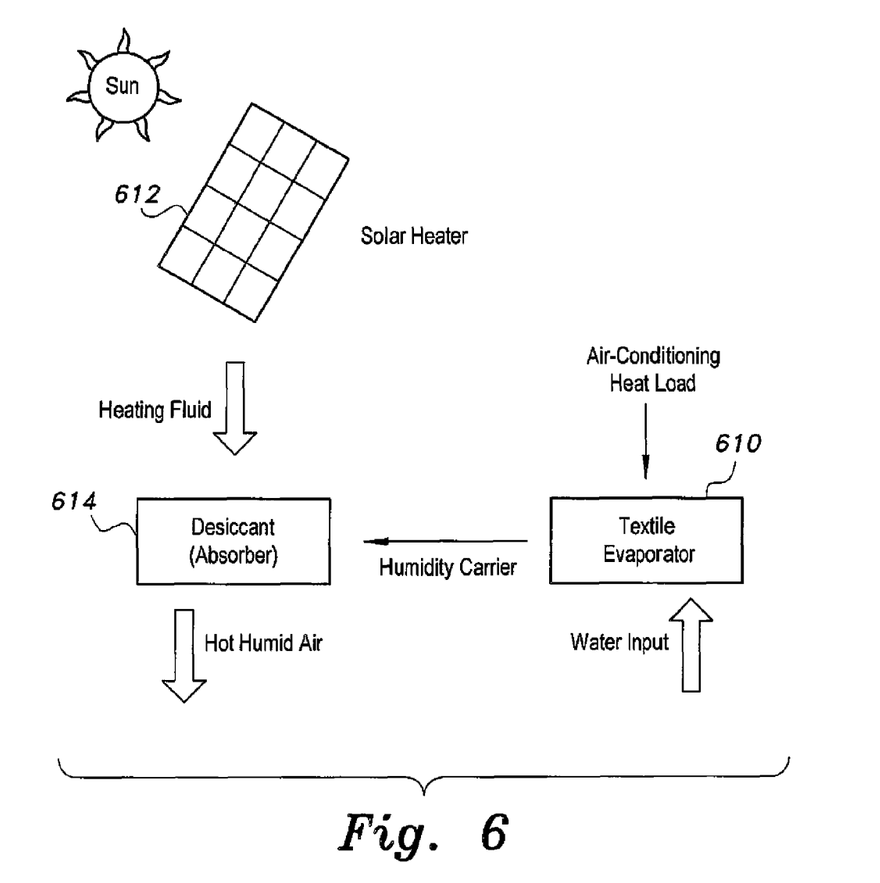
FIG. 6 is a flowchart illustrating the flow paths of water and air in a solar-powered evaporative cooling system.

FIG. 6 is a schematic flowchart of an air conditioning system using a flexible belt evaporator 610 according to the present invention. As in the case of the flexible belt evaporator 510 of FIG. 5, the evaporator 610 may comprise any of the embodiments of the flexible belt evaporator described herein. As in the case of the system of FIG. 5, the system of FIG. 6 initially uses a solar heater 612 to heat a fluid. The hot fluid is used to heat a moisture-absorbent (desiccant) material 614, driving any absorbed moisture therefrom. The desiccant 614 receives warm and moist air from the flexible belt evaporator 610 after the water input has been evaporated therein. As the evaporative process removes heat from the air, the cooled and moist air is used as a heat exchanger to accept waste heat output from an air conditioning system (air conditioning heat load). Other than the energy required to run any required circulation fans or pumps in the system, the air conditioning system of FIG. 6 requires no additional energy, other than the solar input to the solar heater 612, resulting in a very energy efficient system.

It is to be understood that the present invention is not limited to the embodiments described above, but encompasses any and all embodiments within the scope of the following claims.

I claim:

1. A flexible belt evaporator, comprising:
    a plurality of upper guide rollers;
    a plurality of lower guide rollers;
    a wash bath adjacent the upper guide rollers and the lower guide rollers;
    an endless, flexible absorbent fabric belt, the belt being disposed alternatingly about the upper guide rollers and the lower guide rollers in a sinusoidal path and selectively traveling therearound, the belt further having a loop portion disposed in the wash bath, wherein the sinusoidal path of said endless, flexible absorbent fabric belt is positioned external to said wash bath; and
    a salt water dispenser selectively dispensing salt water onto the endless, flexible absorbent fabric belt, wherein water of the salt water dispensed on the endless, flexible absorbent fabric belt evaporates to leave a salt residue on the endless, flexible absorbent fabric belt, the salt residue being washed therefrom in the wash bath.

2. The flexible belt evaporator according to claim 1, wherein the belt is formed of hydrophobic warp strands and hydrophilic weft strands.

3. The flexible belt evaporator according to claim 1, further comprising an ultrasonic device disposed in the wash bath, the ultrasonic device ultrasonically removing the salt residue from the belt as the belt passes through the wash bath.

4. The flexible belt evaporator according to claim 1, further comprising first and second master rollers disposed above the upper guide rollers, the salt water dispenser being disposed between the first and second master rollers.

5. The flexible belt evaporator according to claim 1, wherein the salt water dispenser comprises a plurality of spray nozzles.

6. The flexible belt evaporator according to claim 1, further comprising at least one wash bath roller disposed in the wash bath, the loop portion of the belt passing tautly around the at least one wash bath roller.

7. The flexible belt evaporator according to claim 1, further comprising:
    a first pair of pinch rollers disposed above the wash bath; and
    a second pair of pinch rollers disposed above the wash bath, the loop portion of the belt being disposed loosely between the first pair of pinch rollers and the second pair of pinch rollers.

8. A flexible belt evaporator, comprising:
    a plurality of guide rollers including upper guide roller and lower guide rollers;
    a wash bath adjacent the guide rollers;
    an ultrasonic device disposed in the wash bath;
    an endless, flexible absorbent fabric belt formed of hydrophobic warp strands and hydrophilic weft strands, the belt alternating about the upper guide rollers and the lower guide rollers in a sinusoidal path and selectively traveling therearound, the belt further having a loop portion disposed in the wash bath, the ultrasonic device ultrasonically removing residue from the belt as the belt passes through the wash bath, wherein the sinusoidal path of said endless, flexible absorbent fabric belt is positioned external to said wash bath; and
    a salt water dispenser selectively dispensing salt water onto the endless, flexible absorbent fabric belt, wherein water of the salt water dispensed on the endless, flexible absorbent fabric belt evaporates to leave a salt residue on the endless, flexible absorbent fabric belt, the salt residue being washed therefrom in the wash bath.

9. The flexible belt evaporator according to claim 8, wherein said upper guide rollers are configured in a linear row and said lower guide rollers are configured in a linear row.

10. The flexible belt evaporator according to claim 8, wherein:

said upper guide rollers are configured in a staggered configuration having one row of upper guide rollers staggered above another row of upper guide rollers; and said lower guide rollers are configured in a staggered configuration having one row of lower guide rollers staggered above another row of lower guide rollers, whereby the staggered configuration of the upper guide rollers and the staggered configuration of the lower guide rollers allows a greater number of each to be disposed over a linear distance than a corresponding linear configuration thereof, thus increasing a length of the sinusoidal path of said belt and corresponding evaporative surface area exposed to said salt water dispenser.

11. The flexible belt evaporator according to claim 8 further comprising first and second master rollers disposed above the guide rollers, the water dispenser being disposed between the first and second master rollers, the salt water dispenser comprising a plurality of spray nozzles.

12. The flexible belt evaporator according to claim 8, further comprising at least one wash bath roller disposed in the wash bath, the loop portion of the belt passing tautly around the at least one wash bath roller.

13. The flexible belt evaporator according to claim 8, further comprising:

a first pair of pinch rollers disposed above the wash bath; and a second pair of pinch rollers disposed above the wash bath, the loop portion of the belt being disposed loosely between the first pair of pinch rollers and the second pair of pinch rollers.

14. A flexible belt evaporator, comprising:

a plurality of guide rollers including upper guide roller and lower guide rollers, said upper guide rollers being configured in a staggered configuration having one row of upper guide rollers staggered above another row of upper guide rollers, and said lower guide rollers being configured in a staggered configuration having one row of lower guide rollers staggered above another row of lower guide rollers;

a wash bath adjacent the guide rollers;

an ultrasonic device disposed in the wash bath;

an endless, flexible absorbent fabric belt formed of hydrophobic warp strands and hydrophilic weft strands, the belt alternating about the upper guide rollers and the lower guide rollers in a sinusoidal path and selectively traveling therearound, the belt further having a loop portion disposed in the wash bath, the ultrasonic device ultrasonically removing residue from the belt as the belt passes through the wash bath, wherein the sinusoidal path of said endless, flexible absorbent fabric belt is positioned external to said wash bath; and a salt water dispenser selectively dispensing salt water onto the endless, flexible absorbent fabric belt, wherein water of the salt water dispensed on the endless, flexible absorbent fabric belt evaporates to leave a salt residue on the endless, flexible absorbent fabric belt, the salt residue being washed therefrom in the wash bath, whereby the staggered configuration of the upper guide rollers and the staggered configuration of the lower guide rollers allows a greater number of each to be disposed over a linear distance than a corresponding linear configuration thereof, thus increasing a length of the sinusoidal path of said belt and corresponding evaporative surface area exposed to said salt water dispenser.

* * * * *